REEL MOTOR SPEED REGULATOR

Filed Feb. 26, 1965

INVENTOR
ROBERT S. WOOLDRIDGE, JR.

BY Edward M. Farrell

ATTORNEY 3,360,706

REEL MOTOR SPEED REGULATOR

Robert S. Wooldridge, Jr., Norristown, Pa., assignor to Sperry Rand Corporation, New York, N.Y., a corporation of Delaware Filed Feb. 26, 1965, Ser. No. 435,528
9 Claims. (Cl. 318—305)

ABSTRACT OF THE DISCLOSURE

In accordance with the present invention, a direct current reel motor for removing tape from a loop box and rewinding it on a reel is provided. The voltage developed across the armature of the motor during operation is proportional to the armature speed. A sensing relay is used to sense the armature voltage and operates to open a pair of normally closed contacts when the armature voltage exceeds a predetermined value. A voltage is applied through the normally closed contacts to act as a gate signal to drive a silicon controlled rectifier from a non-conducting to a conducting state to drive the motor. When the armature reaches a predetermined speed, the sensing relay causes the normally closed contacts to open permitting the silicon controlled rectifier to become non-conducting and to discontinue current through the motor. The opening and closing of the contacts limit the average amount of current through the motor as the tape is removed from the loop box. After the motor has reached a predetermined speed and the tape has left the loop box, a switch is actuated to connect a resistor in series with the sensing relay. In order to operate the sensing relay with the resistor in the circuit, a greater voltage must be developed across the armature. This permits the motor to attain a relatively high speed to rewind the tape rapidly.

Figure 1:
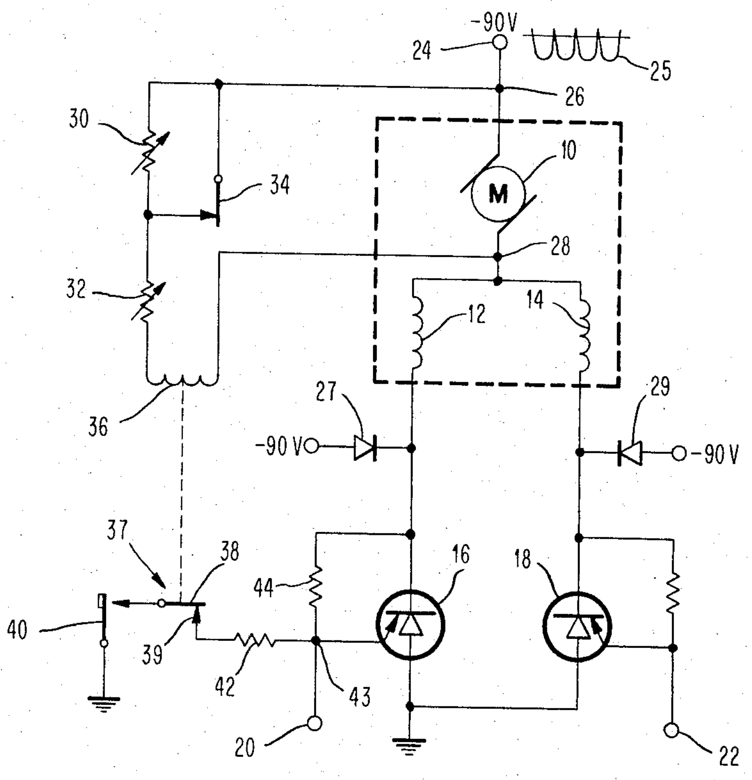

This invention relates to a reel motor speed regulator, and more particularly to means for controlling the speed of magnetic tape during a rewind operation.

The use of vacuum loop boxes for transporting magnetic tape in computer systems is well known. In general, it is necessary to provide relatively free loops of tape between the reels supplying or receiving the tape and the magnetic recording head. The reason for providing such loops of tape is primarily to permit relatively fast acceleration of tape during start and stop times.

The reasons for having free loops of tape for accelerating the tape when it is moved in either of two directions during normal operation are not present for rewind operations. In fact, having the magnetic tape in the form of loops within the loop boxes during rewind operations often presents problems.

In many cases, it is desirable not to have loops in the tape during rewind operations. However, it is still desirable to maintain a maximum operating speed and to assure that the operation of removing the loops from the tape does not take an abnormally long time.

It is an object of this invention to provide an improved circuit for controlling the rewind operation of a magnetic tape.

It is a further object of this invention to provide an improved means for assuring that the tape is removed from a loop box at a relatively high but safe rate of speed.

It is still a further object of this invention to provide a relatively simple circuit which may be incorporated into existing systems to achieve relatively fast rewind of the magnetic tape.

In accordance with the present invention, a direct current reel motor for removing tape from a loop box and rewinding it on a reel is provided. The voltage developed across the armature of the motor during operation is proportional to the armature speed. A sensing relay is used to sense the armature voltage and operates to open a pair of normally closed contacts when the armature voltage exceeds a predetermined value. A voltage is applied through the normally closed contacts to act as a gate signal to drive a silicon controlled rectifier from a non-conducting to a conducting state to drive the motor. When the armature reaches a predetermined speed, the sensing relay causes the normally closed contacts permitting the silicon controlled rectifier to become non-conducting and to discontinue current through the motor. The opening and closing of the contacts limit the average amount of current through the motor as the tape is removed from the loop box. After the motor has reached a predetermined speed and the tape has left the loop box, a switch is actuated to connect a resistor in series with the sensing relay. In order to operate the sensing relay with the resistor in the circuit, a greater voltage must be developed across the armature. This permits the motor to attain a relatively high speed to rewind the tape rapidly.

Figure 2:
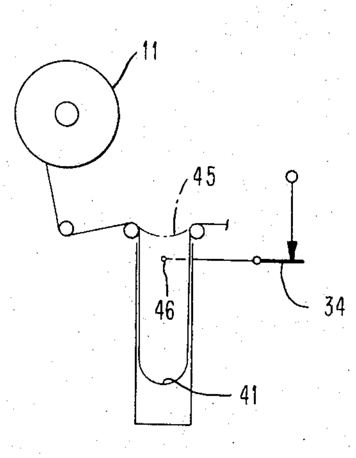

Other objects and advantages of the present invention will be apparent and suggest themselves to those skilled in the art from a reading of the following specification and claims, in conjunction with the accompanying drawing, in which:

FIGURE 1 is a schematic drawing of an electrical circuit for regulating the speed of a reel motor, in accordance with the present invention, and FIGURE 2 represents a vacuum tape loop box with a portion of tape adapted to be driven, in accordance with the present invention.

Referring to FIGURE 1, a portion of the circuit for driving a reel holding magnetic tape to cause the tape to be reeled in or out is illustrated. For purposes of clarity, various control circuits normally associated with tape loop control and included in a computer are not illustrated. Such control circuits, are well known to those skilled in the art and are not directly related to the present invention. However, a portion of the circuit related to driving a supply reel motor is illustrated in combination with the circuit of the present invention which permits fast rewind of the tape, as will be described.

A split series direct current motor 10 includes a pair of series windings 12 and 14. It is understood that the motor 10 may be appropriately mechanical connected to a supply reel in an overall tape storage system, for example, a supply reel 11 illustrated in FIGURE 2. The direction of rotation of the motor 10 is dependent upon the winding through which current flows, i.e. either one of the windings 12 or 14. Such series D.C. motors which are capable of rotation in either of two directions are well known to those skilled in the art.

A pair of silicon controlled rectifiers 16 and 18 are provided to control the current through the windings 12 and 14, respectively, thereby controlling the direction of rotation of the motor 10.

The silicon controlled rectifiers 16 and 18 are appropriately biased so that they are normally cut-off in the absence of any applied gating signals to either of the input terminals 20 and 22. The input terminals 20 and 22 may be connected to other control circuits in a computer system, for example, to selectively apply signals to make one or the other of the silicon controlled rectifiers 16 or 18 conducting. For example, if a gating signal is applied to the gate electrode of the rectifier 18, it will become conducting causing current to flow from terminal 24, through the motor 10 through the winding 14, through the anode and cathode of the rectifier 18, to a point of reference potential, generally designated as ground.

Silicon controlled rectifiers are well known to those skilled in the art. Their main advantage is that they are relatively inexpensive and are capable of drawing heavy current. Such devices act as normal rectifiers, i.e., they include an anode and a cathode, but also include a third electrode for receiving a gating signal. The silicon controlled rectifiers are normally held non-conducting until an appropriate gate signal is applied to a gate electrode. Once a particular silicon rectifier becomes conducting, it generally remains conducting, even though the control signal applied to the gate electrode is discontinued.

Consequently, if a silicon controlled rectifier is to be shut off after the gating signal is discontinued, some appropriate signal must be applied to the rectifier to cut them off. In the embodiment illustrated in the present invention, the voltage applied at the terminal 24 is an unfiltered, full wave, rectified D.C. voltage, as illustrated by a wave form 25. It is noted that while the wave form 25 is negative for a full half cycle, it also goes slightly positive for a short time. This is illustrated by the small portions of the D.C. signal rising slightly above the reference level, designated as zero. With the type of signal 25 applied to the silicon controlled rectifier, the rectifier is cut off by the slightly positive portions of the signal 25. The use of such silicon controlled rectifiers as well as the use of unfiltered D.C. voltage to shut them off are well known to those skilled in the art, and are only incidentally related to the present invention.

Diodes 27 and 29 are provided across the motor to receive the high current resulting from the inductive reactance of the motor when the motor is suddenly turned off. These diodes also are only incidentally related to the present invention.

During operation, when it is desired to reel out tape from a supply reel in a predetermined direction, the silicon controlled rectifier 18 is made conducting by the application of a gating signal to the terminal 22 to actuate the motor 10 in the manner generally described. If it is desired to move the motor 10 in the opposite direction during operation, a gating signal from the computer is applied to the input terminal 20 to cause the silicon controlled rectifier 16 to become conducting. When this happens, current flows from the terminal 24, through the motor 10, through the winding 12, through the rectifier 16, to ground. The direction of current through the winding 12 is such that the motor 10 is rotated in the opposite direction than when current flows through the winding 14.

Up to this point, there has generally been described a circuit for moving tape back and forth between reels during normal operations. There will now be described the circuit involving the present invention which may be incorporated into an existing system to provide the advantages of a fast rewinding of the tape onto a supply reel, such as the reel 11 (FIGURE 2).

In a rewind operation, only one of the rectifiers 16 is affected and made conducting since during the rewind of the tape, only the supply reel is moved in a single direction. In the embodiment illustrated, the silicon controlled rectifier 16 is made conducting so as to provide the current to drive the reel motor 10 in a rewind operation. As mentioned, the motor 10 has a characteristic that the voltage developed across its armature is proportional to the armature speed.

When the motor 10 is moving at a relatively low speed, the voltage developed across the armature at points 26 and 28 will be relatively low. Likewise, if the speed of the motor 10 is high, the voltage across the armature at the points 26 and 28 will be relatively high. This characteristic of having voltages developed across the armature in accordance with the speed of the motor is common to many D.C. conventional motors and well known to those skilled in the art.

The voltage developed across the armature of the motor at points 26 and 28 is applied to a circuit including a pair of variable resistors 30 and 32. The resistor 30 may be varied to provide a maximum safe rewind speed and the resistor 32 may be varied to provide a maximum safe speed of the tape as it moves out of the loop box. A normally closed switch 34 is connected across the resistor 30. A sensing relay 36 is connected between the resistor 32 and point 28. When the current through the sensing relay 36 exceeds a predetermined value, it actuates to open a normally closed switch 37, which includes a movable arm 38 and a fixed contact 39.

When it is desired to perform a rewind operation, a normally open rewind switch 40 is first closed to provide a ground return for the voltage at the terminal 24 which causes current to flow through resistor 42, 44 the winding 12, and the motor 10. The voltage at point 43 acts as a gating signal for the rectifier 16 and causes it to become conducting. When the switch 37 is closed, current will flow through the motor 10 through the rectifier 16 in the desired direction to rewind the tape onto the supply reel.

Referring to FIGURE 2, a supply reel 11 may be connected to be driven by the motor 10 during a rewind operation. A loop of magnetic tape 41 is disposed within a loop box during normal operation. During the initial cycle of the rewind operation, the tape is moved out of the loop box to a position indicated by the dotted lines 45. In passing out of the loop box, the tape 41 passes an aperture 46. The switch 34 is responsive to the passage of the tape past the aperture to cause the switch to open. The means for opening the switch 34 may include vacuum means, photoelectric sensing means or other well known means. The purpose of the switch 34 will be described hereinafter.

Let us first assume that the magnetic tape 41 is disposed in the form of a loop within the loop box. Before starting the rewind operation at a relatively high speed, it is first desired to remove the loop of tape from the loop box at a relatively low rate of speed.

In order to start the rewind operation, the switch 40 is first closed by any suitable means. If the motor 10 starts its rewind operation at a relatively low speed, the sensing relay 36 becomes actuated to move the contact arm 38 away from the fixed contact 39. The opening of the contacts 38 and 39 of the switch 37 prevents current from flowing through the winding 12 since the rectifier 16 becomes non-conducting. The contacts 38 and 39 open and close as to cause a relatively low average current to flow through the motor 10. The vacuum or other means for forming the loop of tape is inactivated by suitable means (not shown) to permit the tape 41 to move out of the loop box 42 at a relatively low rate of speed.

After the tape has passed out of the loop box, it is now safe to rewind the tape at a relatively high rate of speed. At this point, when the switch 34 is open the resistor 30 is effectively inserted into the circuit in series. Because of the added resistance in the circuit, it is now necessary that a greater voltage be developed at the points 26 and 28 in order to actuate the sensing relay 36 to open the contacts 38 and 39. Consequently, the contacts 38 and 39 will remain closed for a greater amount of time to permit a greater average current to drive the motor 10 to attain maximum speed during the rewind operation.

Actually when the rectifier 16 is made conductive when the switch 37 is closed for short times, relatively high pulses of current of short duration is applied to drive the motor 10. Thus a relatively high torque is provided to drive the motor but only for short periods.

It is thus seen that the present invention has provided a relatively simple circuit for fast rewind of magnetic tape. Despite the fast rewind provided, the tape is moved from a loop box at a relatively slow speed to minimize damage to the tape until it is in a position to permit such fast rewind. The invention has provided the fast rewind without the need for substantially modifying the normal circuits used for driving tapes in existing systems.

The embodiments of the invention in which an exclusive property or privilege is claimed are defined as follows:

1. In combination with a motor capable of developing a voltage proportional to its speed and for removing tape from a loop box at a relatively low rate of speed and moving said tape at a relatively high speed after it has left said loop box comprising a source of voltage for driving said motor, sensing means responsive to a relatively low voltage developed across said motor to limit the speed thereof, and means responsive to the movement of said tape out of said loop box to cause said sensing means to be responsive only to a relatively high voltage across said motor to permit said motor to be driven at a relatively high speed.

2. In combination with a motor having an armature developing a voltage proportional to the speed of said motor, a circuit for removing tape from a loop box onto a reel at a relatively low rate of speed and winding said tape on said reel after said tape has been removed from said loop box at a relatively high speed comprising a source of voltage for supplying current to drive said motor, sensing means responsive to a relatively low voltage developed across said armature to limit the current through said motor thereby limiting the speed thereof, means responsive to the movement of said tape out of said loop box to cause said sensing means to be responsive only to a relatively high voltage across said armature to permit a relatively high current to drive said motor at a relatively high speed.

3. In combination with a direct current motor for moving tape through a tape loop box having an armature generating a voltage thereacross proportional to the speed of said motor, a source of voltage, a normally closed switch connecting said source of voltage to drive said motor, a relay for opening said switch when current therethrough exceeds a predetermined level, means for applying the voltage developed across said armature to said relay, said relay being responsive to a relatively low voltage from said armature during a relatively low speed of said motor, resistive means serially connected to said relay, a vacuum switch connected across said resistive means, said vacuum switch being normally closed and becoming open when said tape is moved out of said tape loop box whereby the voltage from said armature necessary to open said relay switch becomes greater thereby permitting said motor to attain a relatively high rate of speed.

4. In combination with a motor having an armature developing a voltage proportional to the speed of said motor, a circuit for removing tape from a loop box onto a reel at a relatively low rate of speed and winding said tape on said reel after said tape has been removed from said loop box at a relatively high speed comprising a source of voltage for supplying current to drive said motor, sensing means including a relay and a resistor responsive to a relatively low voltage developed across said armature to limit the current through said motor limiting the speed thereof, a normally closed vacuum switch connected to make said resistor ineffective, said vacuum switch being responsive to the movement of said tape out of said loop box to cause said switch to open causing said resistor to become effective whereby said sensing means is responsive only to a relatively high voltage across said armature to permit a relatively high current to drive said motor at a relatively high speed.

5. In combination with a motor having an armature developing a voltage proportional to the speed of said motor, a circuit for removing tape from a loop box onto a reel at a relatively lw rate of speed and winding said tape on said reel after said tape has been removed from said loop box at a relatively high speed comprising a source of voltage for supplying current to drive said motor, a silicon controlled rectifier circuit adapted to be switched between conducting and non-conducting states to control the flow of current through said motor, said current through said motor being dependent upon the average conducting times of said silicon controlled rectifier, an input switch for completing a circuit to said source of voltage to cause said silicon controlled rectifier to be switched from a non-conducting to a conducting state, sensing means responsive to a relatively low voltage developed across said armature to cause said input switch to open and close thereby causing said silicon controlled rectifier to be switched back and forth between conducting and non-conducting states to limit the current through said motor thereby limiting the speed thereof, means responsive to the movement of said tape out of said loop box to cause said sensing means to be responsive only to a relatively high voltage across said armature to permit a relatively high current to drive said motor to a relatively high speed.

6. In combination with a motor having an armature developing a voltage proportional to the speed of said motor, means for removing tape from a loop box onto a reel at a relatively low rate of speed and winding said tape on said reel after said tape has been removed from said loop box at a relatively high speed comprising a source of voltage for supplying current to drive said motor, a silicon controlled rectifier circuit adapted to be switched between conducting and non-conducting states to control the flow of current through said motor, said current through said motor being dependent upon the average conducting times of said silicon controlled rectifier, an input relay switch for completing a circuit to said source of voltage to cause said silicon controlled rectifier to be switched from a non-conducting to a conducting state, a sensing circuit including a relay responsive to a relatively low voltage developed across said armature to cause said input switch to open and close thereby causing said silicon controlled rectifier to be switched back and forth between conducting and non-conducting states to limit the current through said motor thereby limiting the speed thereof, a resistor connected to said relay, a normally closed switch associated with said tape loop box connected across said resistor, said switch being responsive to open when said tape is moved out of said loop box to cause said resistor to be connected to said relay whereby said sensing means is responsive only to a relatively high voltage across said armature thereby permitting a relatively high current to drive said motor at a relatively high speed.

7. The invention as set forth in claim 6 wherein the source of voltage for supplying current to drive said motor comprises a full wave rectified signal with portions of said signal acting to drive said silicon controlled rectifier to a non-conducting state.

8. The invention as set forth in claim 7 wherein said resistor is variable to control the maximum rewind speed of said motor.

9. The invention as set forth in claim 8 wherein a second variable resistor is connected to said relay to control the maximum speed of said motor when said tape is leaving said loop box.

References Cited

UNITED STATES PATENTS

| | | | |
|---|---|---|---|
| 3,237,073 | 2/1966 | Bartley et al. | 318—345 X |
| 3,251,563 | 5/1966 | Kleist et al. | |

ORIS L. RADER, *Primary Examiner.*

B. A. COOPER, *Assistant Examiner.*